J. F. O'CONNOR.
ANTIFRICTION BEARING.
APPLICATION FILED JULY 1, 1918.
1,290,329.
Patented Jan. 7, 1919.
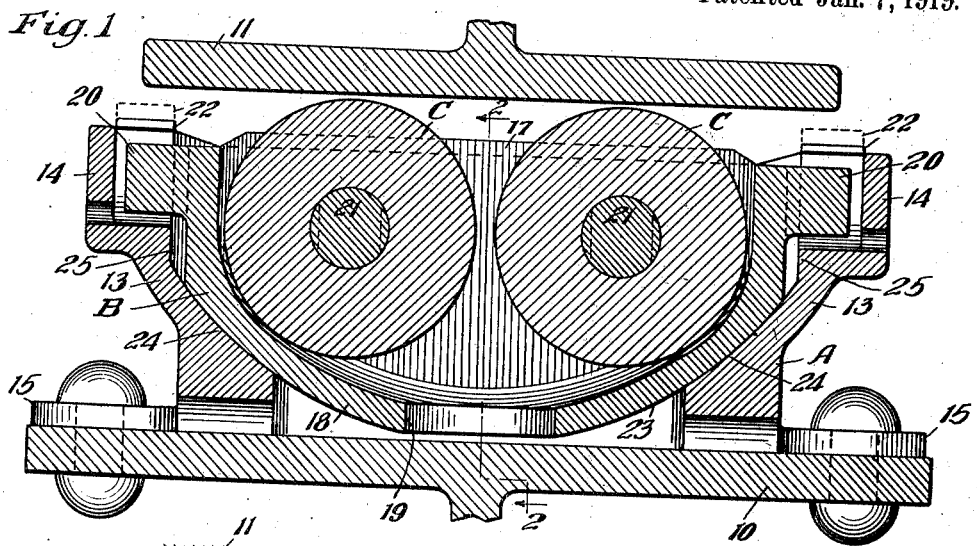
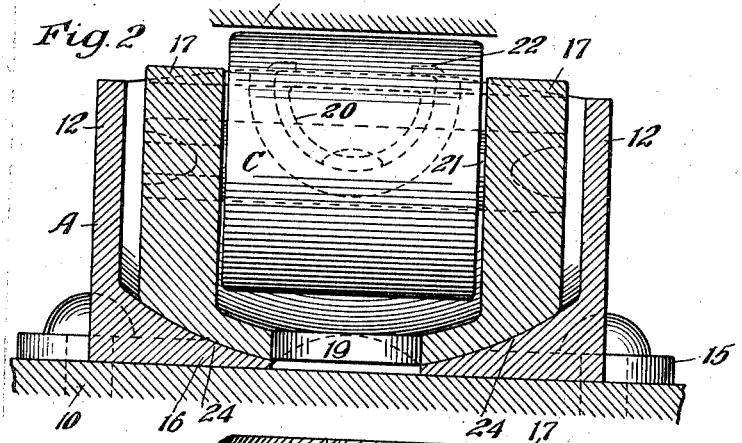
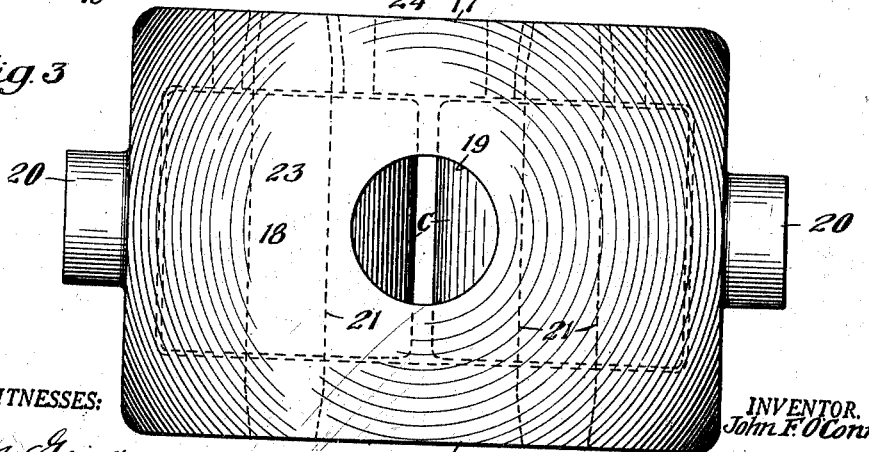
WITNESSES:
Wm. Geiger
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

ANTIFRICTION-BEARING.

1,290,329.  Specification of Letters Patent.  Patented Jan. 7, 1919.

Application filed July 1, 1918. Serial No. 242,823.

*To all whom it may concern:*

Be it known that I, JOHN F. O'CONNOR, a citizen of the United States, residing at Chicago, in the county of Cook and State of Illinois, have invented a certain new and useful Improvement in Antifriction-Bearings, of which the following is a full, clear, concise, and exact description, reference being had to the accompanying drawings, forming a part of this specification.

This invention relates to improvements in anti-friction bearings.

The object of the invention is to provide a multiple roller anti-friction bearing especially adapted for use on railway cars as side bearings, the anti-friction rollers being so mounted as to be adjustable in such manner as to insure proper contact of all of the rollers simultaneously and proper contact of each roller individually.

In the drawing forming a part of this specification, Figure 1 is a vertical, sectional view of a side bearing embodying my improvements showing the same as applied to the truck bolster of a car. The section is taken lengthwise of the car, that is, transverse to the truck and body bolsters. Fig. 2 is a sectional view, taken substantially on the line 2—2 of Fig. 1. And Fig. 3 is a bottom plan view of the roller carrying cradle employed with my invention.

In said drawing, 10 denotes the upper portion of a truck bolster and 11 the under side of a body bolster. The improved roller side bearing is shown attached to the truck bolster and comprises, broadly, a base or retaining member or casting A; a cradle or roller carrying member B; and a plurality of anti-friction rollers C—C.

The retaining member A, as shown, is of hollow box-like formation having parallel side walls 12—12, curved end walls 13—13, with enlargements 14—14 for the purpose hereinafter described, perforated lugs or ears 15—15 by which it is riveted to the truck bolster, and a partial bottom 16.

The cradle B, as shown, is formed with relatively heavy, longitudinally extending side walls 17—17, a spherical bottom 18 having a central opening 19, and lugs 20—20 at its ends which operate within the enlargements 14.

Mounted in the cradle B are two cylindrical anti-friction rollers C each rotatably supported on a journal 21, the journals 21 being seated at their ends in said side walls 17 of the cradle. To hold the cradle against accidental displacement after it has been assembled with the retaining member A, the latter is provided with bendable tongues or flanges 22—22 which may be hammered over the lugs 20 as indicated by the dotted lines in Fig. 2. The dotted lines in Fig. 1 indicate the normal position of said tongues 22 before they are bent down into place for the purpose specified.

As heretofore indicated, the bottom of the cradle is spherically formed and has a bottom spherical bearing surface 23. The upper surface of the bottom 16 of the retaining member A is also provided with a coöperating spherical surface 24. As clearly shown in Figs. 1 and 2, when the cradle B is in normal central position, there is clearance between the side walls of the cradle and the side walls of the retaining member A and also between the ends of the cradle B and the vertical shoulders 25—25 formed on the interior of the member A as shown in Fig. 1. With this construction, it is evident that the cradle B is permitted a universal movement so that a line contact between each anti-friction roller and the body bolster thereabove is insured and in addition, the cradle will automatically adjust itself so that the pressure is distributed equally to the anti-friction rollers. In this manner, I obtain a side bearing which automatically adjusts itself to varying conditions in service which may occur either in the original assembling of the car parts or from wear or distortion in service. Furthermore, the design of the cradle is such that it is unusually strong, pressure from the anti-friction rollers being transmitted vertically downward through the side walls 17 into a compression force applied to the bottom of the cradle which in turn is transmitted through the bottom of the member A to the bolster. Also, it will be noted that the cradle is limited in its movement either transversely or longitudinally by engagement of the adjacent coöperating parts of the cradle and retaining member.

Although I have herein shown and described what I now consider the preferred manner of carrying out the invention, the same is merely illustrative and I contemplate all changes that come within the scope of the claims appended hereto.

I claim:

1. In an anti-friction bearing, the combination with a retaining member having upstanding walls and a bottom wall provided on its upper face with a spherical surface, of a hollow cradle having side and end walls and an integral bottom wall provided with a spherical surface on the under side, the latter coöperating with the bottom surface of the retaining member, and a plurality of anti-friction rollers mounted within the cradle, the walls of said retaining member and cradle being normally spaced and adapted to limit the movements of the cradle with respect to the retaining member.

2. In an anti-friction bearing, the combination with a base casting having a bottom wall, said bottom wall having a spherical upper bearing surface, of a hollow cradle having side walls and an integral bottom wall, the latter being provided also on its under side with a spherical bearing surface coöperable with that of the base casting, and a plurality of anti-friction rollers mounted on journals supported by said side walls of the cradle, the cradle being universally adjustable with respect to the base casting.

In witness that I claim the foregoing I have hereunto subscribed my name this 15th day of June, 1918.

JOHN F. O'CONNOR.